(12) United States Patent
Avins et al.

(10) Patent No.: US 7,934,997 B2
(45) Date of Patent: May 3, 2011

(54) TORQUE LIMITER AND METHOD FOR ASSEMBLYING A TORQUE LIMITER

(75) Inventors: David C. Avins, Burbank, OH (US); Mark Graf, Creston, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 621 days.

(21) Appl. No.: 11/986,131

(22) Filed: Nov. 20, 2007

(65) Prior Publication Data

US 2008/0128235 A1 Jun. 5, 2008

Related U.S. Application Data

(60) Provisional application No. 60/861,948, filed on Nov. 30, 2006.

(51) Int. Cl.
*F16D 7/02* (2006.01)
(52) U.S. Cl. .............................. 464/10; 464/46; 464/68.1
(58) Field of Classification Search .................... 464/10, 464/46, 68.1; 192/3.29
See application file for complete search history.

(56) References Cited

U.S. PATENT DOCUMENTS 6,796,411 B2 * 9/2004 Bauer et al. .................. 192/3.29
2006/0225984 A1 * 10/2006 Tanishima et al.

FOREIGN PATENT DOCUMENTS

JP 2000-196036 7/2000
JP 2002-013547 1/2002

* cited by examiner

*Primary Examiner* — Greg Binda
(74) *Attorney, Agent, or Firm* — Simpson & Simpson, PLLC

(57) ABSTRACT

The present invention broadly comprises a torque limiter including a sealed vessel with a damper assembly and a clutch arranged to receive torque from a drive unit and to transmit the torque to the damper assembly. The clutch is loaded independent of an engagement of the limiter with the drive unit. A reaction force between a resilient element in the clutch and the vessel preloads the clutch. The clutch is arranged to slip at a specified torque value. The resilient element is arranged to preload the clutch such that the clutch remains fully engaged up to the specified torque value. In some aspects, the limiter includes a drive unit connection plate and the clutch is disposed between the connection plate and the vessel. In some aspects, the vessel includes a housing connected to the connection plate and the clutch is disposed between the housing and the damper assembly.

14 Claims, 4 Drawing Sheets

TORQUE LIMITER AND METHOD FOR ASSEMBLYING A TORQUE LIMITER

CROSS-REFERENCE TO RELATED APPLICATIONS

This application claims the benefit under 35 U.S.C. §119 (e) of U.S. Provisional Application No. 60/861,948 filed Nov. 30, 2006, which application is incorporated herein by reference.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to an apparatus located between an engine and a transmission and designed to attenuate torque spikes associated with a hybrid gas/electric engine system. Specifically, the apparatus includes a pre-loaded clutch designed to slip at a predetermined torque level.

BACKGROUND OF THE INVENTION

In certain vehicular applications, in particular for vehicles with hybrid gas/electric engine systems, spikes in the torque generated by the engine system and transmitted to a transmission for the vehicle can cause damage to the transmission, for example, damage to the power shaft of the transmission.

It is known to provide torque limiting and dampening between the above engine systems and the transmission, for example, as described in Japanese patent application 2000196036. Unfortunately, the clutch in these torque limiting and dampening devices cannot be preloaded prior to installation in the vehicle. That is, extra time and expense must be expended to properly ship and install the devices. In particular, a spring that is used to load the clutch can only provide the loading force when installed in the vehicle. That is, the spring reacts against the installed vehicle to provide the loading force.

Thus, there is a long-felt need for a torque limiting and dampening device that is modular and includes a preloaded clutch to minimize steps associated with installation of the device in a vehicle.

BRIEF SUMMARY OF THE INVENTION

The present invention broadly comprises a torque limiter including a sealed vessel with a damper assembly and a clutch arranged to receive torque from a drive unit and to transmit the torque to the damper assembly. The clutch is loaded independent of an engagement of the limiter with the drive unit and the clutch is arranged to slip at a specified torque value. The limiter also includes a resilient element arranged to preload the clutch such that the clutch remains fully engaged up to the specified torque value.

In some aspects, the limiter includes a drive unit connection plate arranged for connection to the drive unit and the clutch is disposed between the drive unit connection plate and the vessel. In some aspects, the clutch is a dry clutch. In some aspects, the vessel comprises a housing, the clutch is connected to the housing, the clutch is arranged to transfer the drive unit torque to the housing, and the resilient element is secured to the housing.

In some aspects, the limiter includes a drive unit connection plate arranged for connection to the drive unit, the vessel includes a first housing connected to the drive unit connection plate, and the clutch is disposed between the first housing and the damper assembly. In some aspects, the sealed housing encloses a fluid or the vessel includes a second housing and the resilient element is slidingly engaged with the second housing. In some aspects, the second housing is in contact with the resilient element and the resilient element preloads the clutch in response to the contact. In some aspects, the limiter includes a snap ring engaged with the first housing and in contact with the resilient element and the resilient element preloads the clutch in response to the contact.

The present invention also broadly comprises a torque limiter including a drive unit connection plate arranged for connection to a drive unit and to transmit torque from the drive unit, a sealed vessel with a damper assembly, and a clutch in a torque transmission path between the drive unit connection plate and the damper. A reaction force between a resilient element in the clutch and the vessel preloads the clutch and the clutch is arranged to slip at a specified torque value. In some aspects, the clutch is disposed between the drive unit connection plate and the sealed vessel. In some aspects, the vessel further comprises a housing and the clutch is disposed between the housing and the damper assembly.

The present invention further broadly comprises a method for assembling a torque limiter including the steps of stacking a resilient element on a first portion of a damper housing; stacking a clutch and damper assembly on the resilient element; and engaging the first portion with a second portion of the damper housing so that the resilient element loads the clutch and the clutch slips at a specified torque value. In some aspects, the method includes welding the first and second portions to seal the housing.

The present invention broadly comprises a method for assembling a torque limiter including the steps of stacking a clutch and damper assembly on a first portion of a damper housing; stacking a resilient element on the clutch and damper assembly; and axially securing the resilient element to the first portion so that the resilient element loads the clutch and the clutch slips at a specified torque value. In some aspects, the method includes engaging the first portion with a second portion of the damper housing and welding the first and second portions to seal the vessel. In some aspects, axially securing the resilient element to the first portion includes engaging a snap ring with the first portion and the resilient element.

It is a general object of the present invention to provide a pre-assembled modular device to limiting torque spikes transmitted from a drive unit to a transmission.

It is another object of the present invention to provide a toque limiting device using fluid-assisted dampening.

It is a further object of the present invention to provide a torque limiting device using a dry clutch or a wet clutch.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
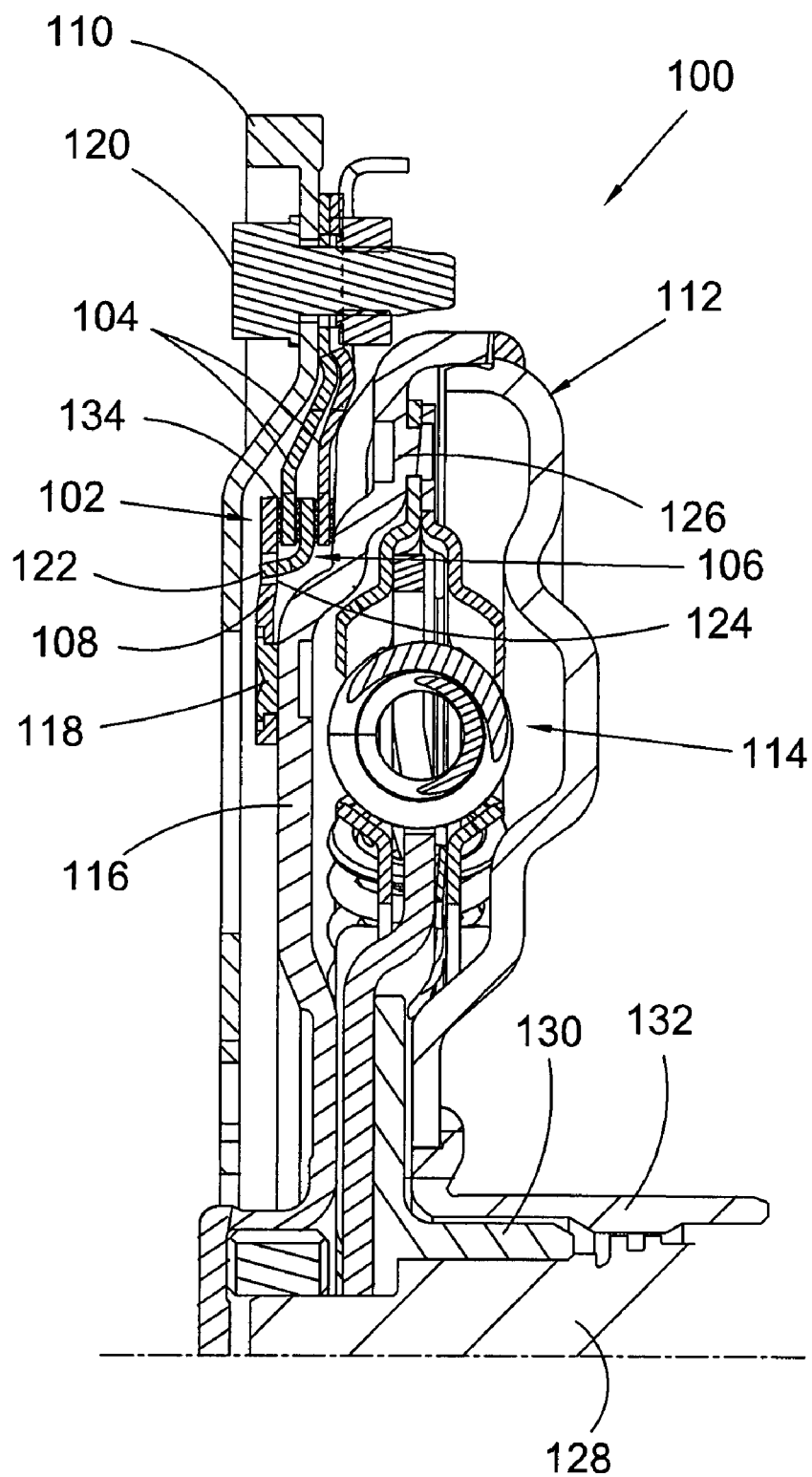
FIG. 1 is a partial cross-sectional view of a present invention torque limiter with a dry clutch.

FIG. 1 is a partial cross-sectional view of present invention torque limiter 100 with clutch 102. In some aspects, clutch 102 is a dry clutch. Clutch 102 includes drive plates 104, drive plate 106, and resilient element 108. Drive plates 104 are connected to drive unit connection plate, or flexplate, 110. Although a particular flexplate configuration is shown in the figure, it should be understood that any means known in the art can be used to connect limiter 100 to a drive unit. Limiter 100 also includes sealed vessel 112 enclosing damper assembly 114 and a fluid (not shown), such as cooling oil. Although two drive plates 104 and one drive plate 106 are shown in the figure, it should be understood that other numbers of drive plates 104 and 106 can be used with limiter 100. Flexplate 110 is arranged for connection to a drive unit (not shown) and to receive and transmit torque from the drive unit. Clutch 102 is arranged to receive torque from the drive unit and to transmit the torque to the damper assembly.

Clutch 102 is loaded independent of the engagement of limiter 100 with the drive unit, for example, independent of the connection of flexplate 110 to the drive unit, and is arranged to slip at a specified torque value. For example, the clutch begins to slip when the drive torque transmitted by the flexplate reaches the specified value. By loaded we mean that a force, for example, an axial force, is applied to the clutch such that the clutch is fully engaged and transferring torque from the flexplate. When the torque seen by the clutch reaches the specified value, the forces associated with the torque are greater than the load on the clutch and the clutch begins to slip. For example, clutch 102 slips when torque spikes from the drive unit exceed the specified value. Resilient element 108 applies the preload to the clutch. Any means known in the art, for example, a diaphragm spring, can be used for element 108. Element 108 is connected to housing 116 of the vessel by any means known in the art, for example, by extruded rivets 118. Element 108 applies the load to the clutch in reaction to the connection with the housing regardless of any connection of limiter 100 to a drive unit. Alternately stated, a reaction force between the resilient element and the vessel preloads the clutch. Hence, the loading of the clutch by element 108 is not associated with or dependent upon the eventual connection of the assembly to a drive unit. Thus, assembly 100 is a pre-loaded modular unit that does not require any further manipulation of parts to attain a loaded state for the clutch, greatly simplifying the eventual installation of limiter 100 into a drive train.

Fasteners 120 connect the flexplate to drive plates 104. In some aspects, the fasteners are bolts, although it should be understood that any fastener known in the art can be used for fasteners 120. Limiter 100 is not limited to any particular number of fasteners 120. In some aspects, four to six fasteners are used. Thus, fasteners 120 transfer the drive unit torque from the flexplate to the drive plates. Plate 106 is rotationally connected to element 108 through complementary extensions 122 on the plate and openings 124 in the element. By rotationally connected, or fixed, we mean that the plate and element are connected such that the two components rotate together, that is, the two components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other. The preceding explanation of rotational connection is applicable to the discussions infra. However, any means known in the art can be used to connect the plate and element.

Clutch 102 transfers the drive unit torque to housing 116, which is connected to the damper by any means known in the art, for example, extruded rivets 126. The damper is arranged for rotation connection to input shaft 128 of a transmission (not shown) by any means known in the art, for example, hub 130 and pump hub 132. Thus, a torque path from the drive unit to the transmission is established through limiter 100. The torque path includes torque limiting through the slipping action of clutch 102 and dampening through the operation of damper 114.

In some aspects, friction material 134 is axially disposed between the drive plates, element 108, and/or housing 116. Clutch 102 is not limited to any particular type or configuration of friction materials. In some aspects, friction materials are fixedly secured to the drive plates, element 108, and/or housing 116. In some aspects, clutch plates are disposed axially between the drive plates, element 108, and/or housing 116. In some aspects, there is no friction material used, or a rust-preventive material, such as grease, is applied to the drive plates, element 108, and/or housing 116.

Figure 2:
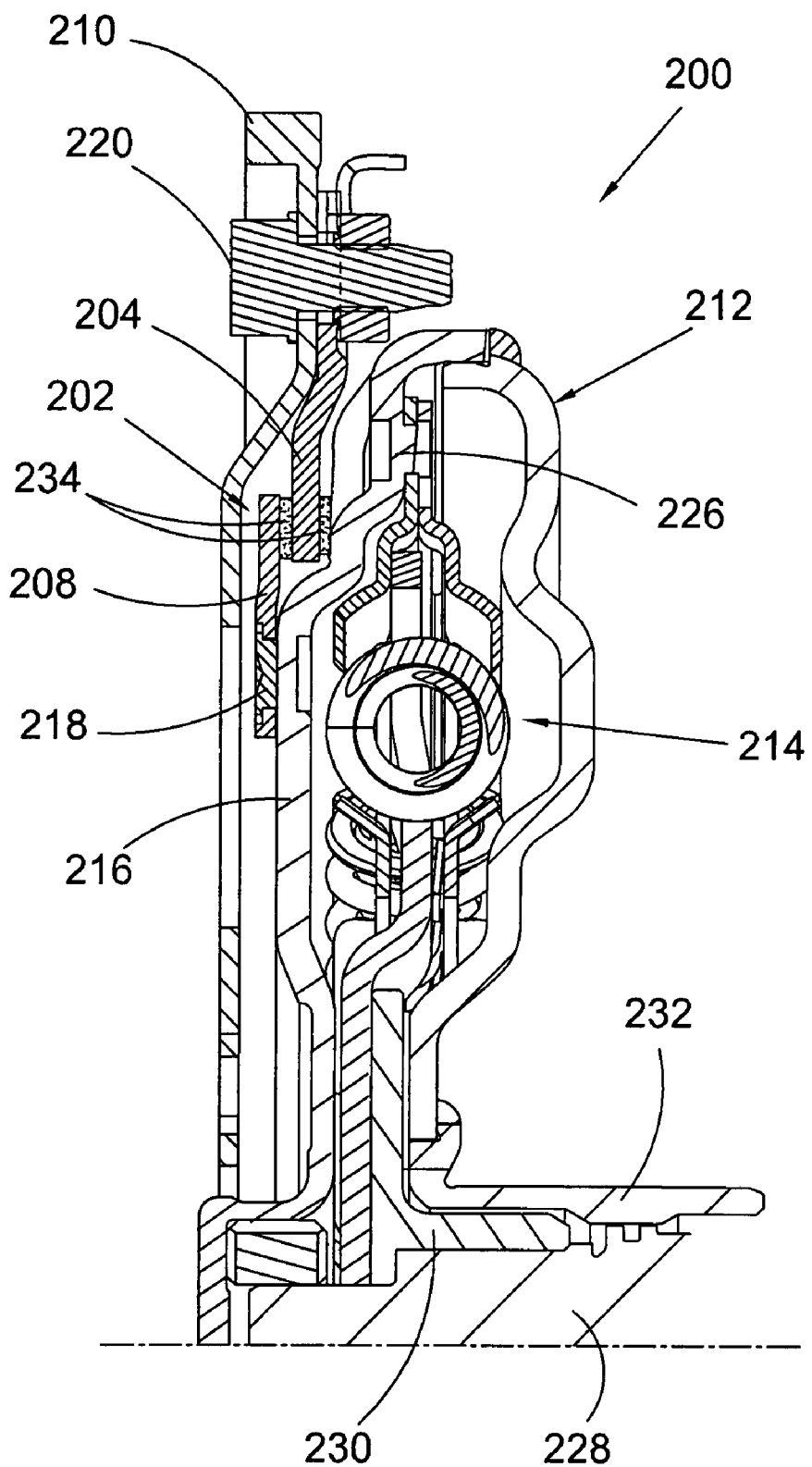
FIG. 2 is a partial cross-sectional view of a present invention torque limiter with a dry clutch.

FIG. 2 is a partial cross-sectional view of present invention torque limiter 200 with clutch 202. In some aspects, the clutch is a dry clutch. The following should be viewed in light of FIGS. 1 and 2. Clutch 202 includes drive plate 204 and resilient element 208. Drive plate 204 is connected to drive unit connection plate, or flexplate, 210. Limiter 200 also includes sealed vessel 212 enclosing damper assembly 214 and a fluid (not shown), such as cooling oil. Flexplate 210 is arranged for connection to a drive unit (not shown) and to receive and transmit torque from the drive unit. Clutch 202 is arranged to receive torque from the drive unit and to transmit the torque to the damper assembly.

As described for clutch 102 and limiter 100, clutch 202 is loaded independent of the engagement of limiter 200 with the drive unit, for example, independent of the connection of flexplate 210 to the drive unit, and is arranged to slip at a specified torque value. Resilient element 208 applies the preload to the clutch. Any means known in the art, for example, a diaphragm spring, can be used for element 208. Element 208 is connected to housing 216 of the vessel by any means known in the art, for example, by extruded rivets 218. Element 208 applies the load to the clutch in reaction to the connection with the housing regardless of any connection of limiter 200 to a drive unit. Alternately stated, a reaction force between the resilient element and the vessel preloads the clutch. Thus, assembly 200 is a pre-loaded modular unit that does not require any further manipulation of parts to attain a loaded state for the clutch, greatly simplifying the eventual installation of limiter 200 into a drive train.

Fasteners 220 connect the flexplate to drive plate 204. In some aspects, the fasteners are bolts, although it should be understood that any fastener known in the art can be used for fasteners 220. Limiter 200 is not limited to any particular number of fasteners 220. In some aspects, four to six fasteners are used. Thus, fasteners 220 transfer the drive unit torque from the flexplate to the drive plates.

Clutch 202 transfers the drive unit torque to housing 216, which is connected to the damper by any means known in the art, for example, extruded rivets 226. The damper is arranged for rotation connection to input shaft 228 of a transmission (not shown) by any means known in the art, for example, hub 230 and pump hub 232. Thus, a torque path from the drive unit to the transmission is established through limiter 200. The torque path includes torque limiting through the slipping action of clutch 202 and dampening through the operation of damper 214.

In some aspects, friction material 234 is axially disposed between the drive plate, element 208, and/or housing 216. Clutch 202 is not limited to any particular type or configuration of friction materials 234. In some aspects, friction materials are fixedly secured to the drive plate, element 208, and/or housing 216. In some aspects, clutch plates are disposed axially between the drive plate, element 208, and/or housing 216. In some aspects, there is no friction material used, or a rust-preventive material, such as grease, is applied to the drive plate, element 208, and/or housing 216.

Figure 3:
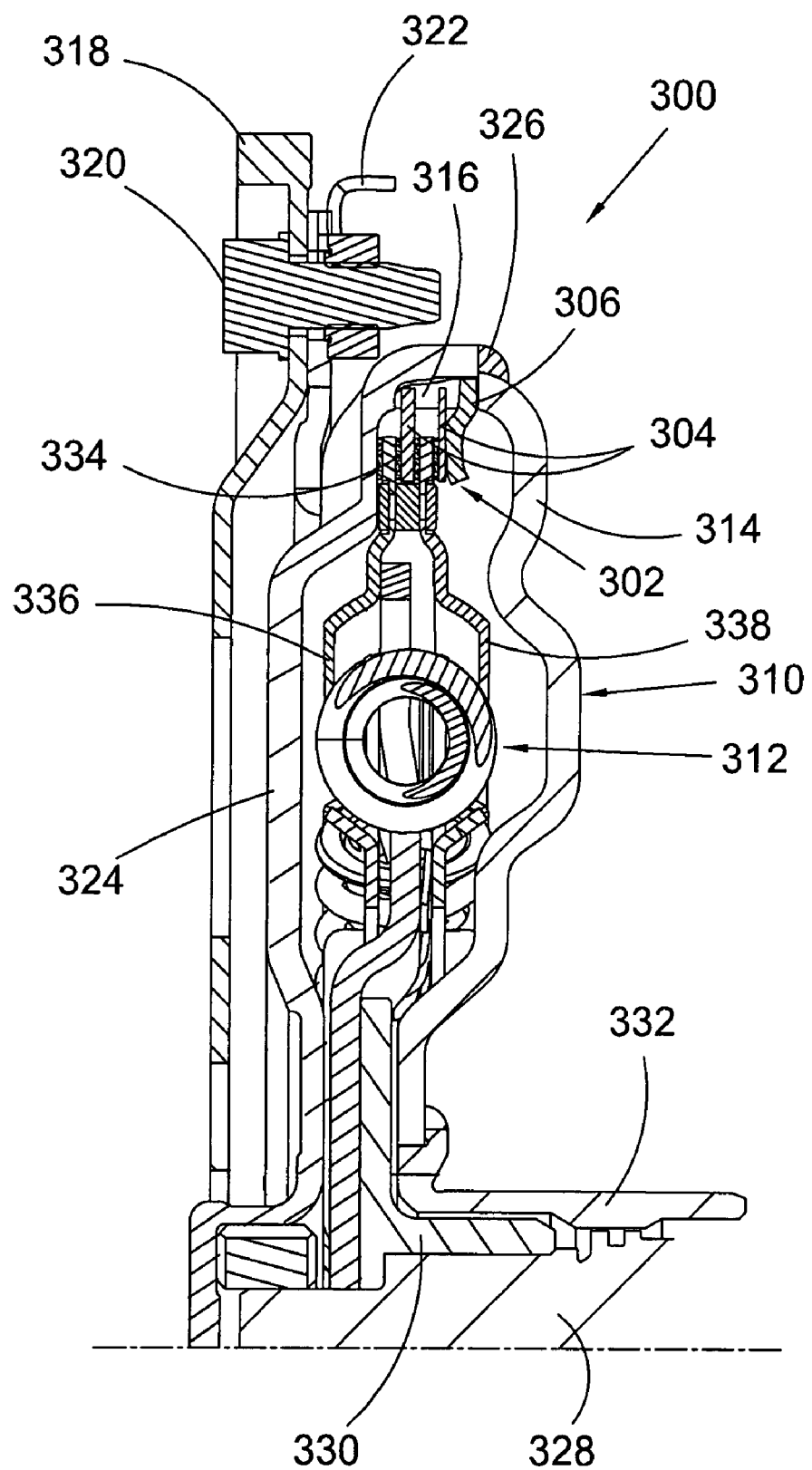
FIG. 3 is a partial cross-sectional view of a present invention torque limiter with a wet clutch; and, FIG. 4 is a partial cross-sectional view of a present invention torque limiter with a wet clutch.

FIG. 3 is a partial cross-sectional view of present invention torque limiter 300 with wet clutch 302. Clutch 302 includes drive plates 304 and resilient element 306. Although two drive plates 304 are shown in the figure, it should be understood that other numbers of drive plates can be used with limiter 300. Limiter 300 also includes sealed vessel 310 enclosing damper assembly 312 and a fluid (not shown), such as cooling oil. Drive plates 304 are slidingly connected to housing 314 of the vessel through complementary extensions 316 on the housing and grooves (not visible) in the drive plates. However, it should be understood that any means known in the art can be used to slidingly connect the drive plates and housing. By slidingly engage, we mean that the plates are rotationally fixed to the housing but axially displaceable with respect to the housing as further described infra.

Limiter 300 also includes drive unit connection plate, or flexplate, 318 arranged to connect to and transmit torque from a drive unit (not shown). Although a particular flexplate configuration is shown in the figure, it should be understood that any means known in the art can be used to connect limiter 300 to a drive unit. Vessel 310 is rotationally connected to the flexplate. In some aspects, fasteners 320 connect drive plate 322 to the flexplate and drive plate 322 is connected to housing 324 of the vessel with a spline connection. In some aspects, the fasteners are bolts, although it should be understood that any fastener known in the art can be used for fasteners 320. Limiter 300 is not limited to any particular number of fasteners 320. In some aspects, four to six fasteners are used. Thus, fasteners 320 transfer the drive unit torque from the flexplate to drive plate 322. Any means known in the art, for example, welding, can be used to rotationally connect drive plate 322 and housing 324. Housing 324 is connected to housing 314 by any means known in the art, for example, weld 326, and is arranged to transfer drive unit torque to housing 314. Clutch 302 is arranged to receive torque from housing 314 and to transmit the torque to the damper assembly.

Clutch 302 is loaded independent of the engagement of limiter 300 with the drive unit, for example, independent of the connection of flexplate 318 to the drive unit and is arranged to slip at a specified torque value. For example, clutch 302 slips when torque spikes from the drive unit exceed the specified value. Resilient element 306 applies the preload to the clutch. Any means known in the art, for example, a diaphragm spring, can be used for element 306. Element 306 applies the load to the clutch in reaction to the connection with housing 314 regardless of any connection of limiter 300 to a drive unit. Alternately stated, a reaction force between the resilient element and the vessel preloads the clutch. Hence, the loading of the clutch by element 306 is not associated with or dependent upon the eventual connection of the assembly to a drive unit. Thus, assembly 300 is a pre-loaded modular unit that does not require any further manipulation of parts to attain a loaded state for the clutch greatly simplifying the eventual installation of limiter 300 into a drive train.

In some aspects, clutch 302 is assembled by stacking the damper assembly and drive plates in housing 324 and then stacking element 306 on the drive plates. Housing 314 is then stacked so that extensions 316 interface with the drive plates and resilient element. Housing 314 is then held in place and connected to housing 324, for example, by weld 326. In some aspects, clutch 302 is assembled by stacking the damper assembly, drive plates, and resilient element on housing 314 and protrusions 316. Then, housing 314 is stacked on housing 324 and the housings are held in place and connected, for example, by weld 326. Thus, the stacking of housing 314 applies axial force to element 306 and the element reacts against the housing to apply the preload force to clutch 302.

Damper 312 is arranged for rotation connection to input shaft 328 of a transmission (not shown) by any means known in the art, for example, hub 330 and pump hub 332. Thus, a torque path from the drive unit to the transmission is established through limiter 300. The torque path includes torque limiting through the slipping action of clutch 302 and dampening through the operation of damper 312.

In some aspects, friction material 334 is axially disposed between the drive plates, plates 336 and 338, and/or element 306. Clutch 302 is not limited to any particular type or configuration of friction materials 334. Clutch 302 is not limited to any number of plates 336 or 338. In some aspects, friction materials are fixedly secured to the drive plates, plates 336 and 338, and/or element 306. In some aspects, clutch plates are disposed axially between the drive plates, plates 336 and 338, and/or element 306. In some aspects, there is no friction material used, or a rust-preventive material, such as grease, is applied to the drive plates, plates 336 and 338, and/or element 306.

Figure 4:
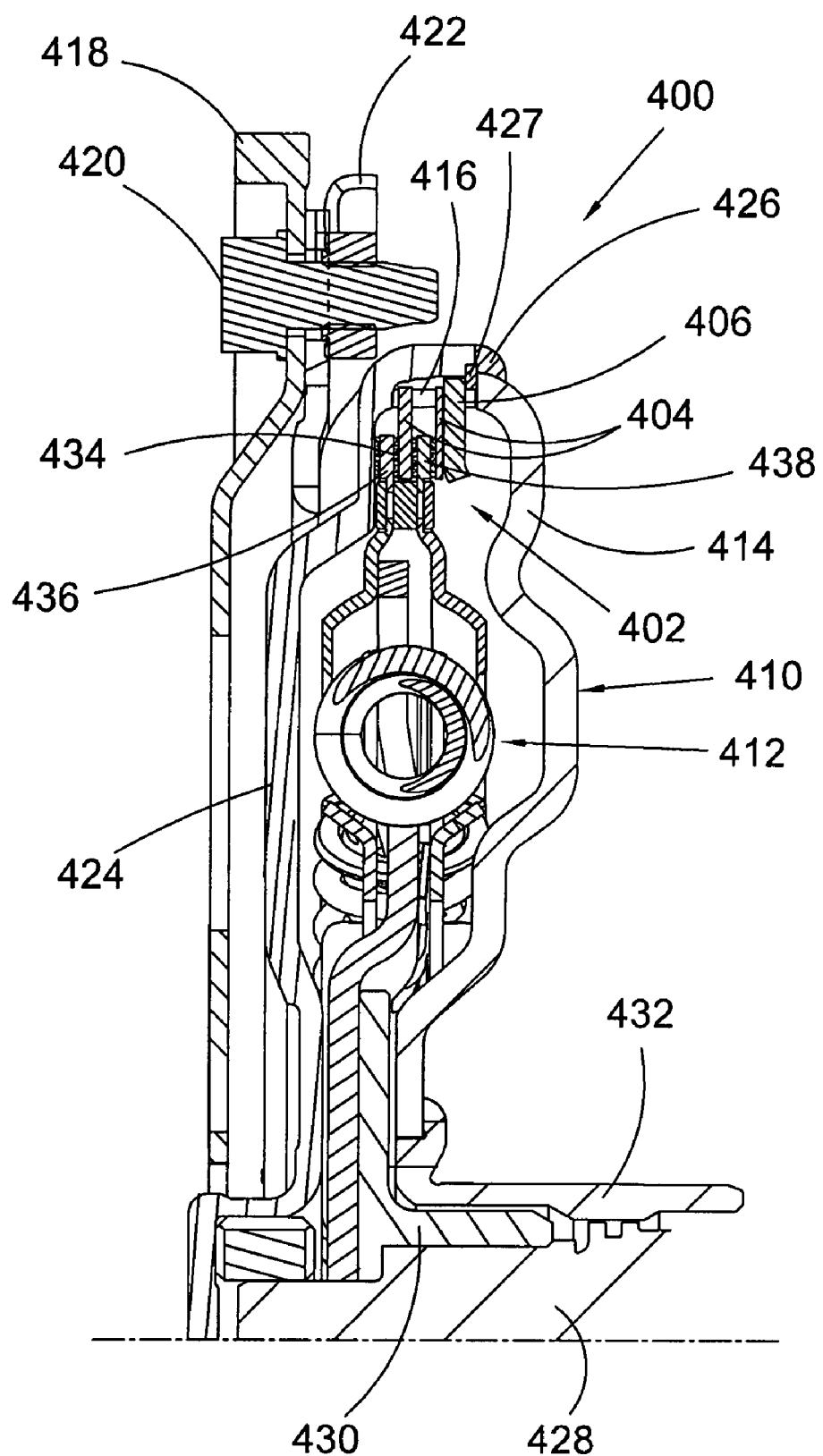

FIG. 4 is a partial cross-sectional view of present invention torque limiter 400 with wet clutch 402. Clutch 402 includes drive plates 404 and resilient element 406. Although two drive plates 404 are shown in the figure, it should be understood that other numbers of drive plates can be used with limiter 400. Limiter 400 also includes sealed vessel 410 enclosing damper assembly 412 and a fluid (not shown), such as cooling oil. Drive plates 404 are slidingly connected to housing 414 of the vessel through complementary extensions 416 on the housing and grooves in the drive plates. However, it should be understood that any means known in the art can be used to slidingly connect the drive plates and housing.

Limiter 400 also includes drive unit connection plate, or flexplate, 418 arranged to connected to and transmit torque from a drive unit (not shown). Although a particular flexplate configuration is shown in the figure, it should be understood that any means known in the art can be used to connect limiter 400 to a drive unit. Vessel 410 is rotationally connected to the flexplate. In some aspects, fasteners 420 connect drive plate 422 to the flexplate and drive plate 422 is connected to housing 424 of the vessel with a spline connection. In some aspects, the fasteners are bolts, although it should be understood that any fastener known in the art can be used for fasteners 420. Limiter 400 is not limited to any particular number of fasteners 420. In some aspects, four to six fasteners are used. Thus, fasteners 420 transfer the drive unit torque from the flexplate to drive plate 422. Any means known in the art, for example, welding, can be used to rotationally connect drive plate 422 and housing 424. Housing 424 is connected to housing 414 by any means known in the art, for example, weld 426, and is arranged to transfer drive unit torque to housing 414. Clutch 402 is arranged to receive torque from housing 414 and to transmit the torque to the damper assembly.

Clutch 402 is loaded independent of the engagement of limiter 400 with the drive unit, for example, independent of the connection of flexplate 418 to the drive unit and is arranged to slip at a specified torque value. For example, clutch 402 slips when torque spikes from the drive unit exceed the specified value. Resilient element 406 applies the preload to the clutch. Any means known in the art, for example, a diaphragm spring, can be used for element 406. Element 406 applies the load to the clutch in reaction to the connection with the housing regardless of any connection of limiter 400 to a drive unit. Alternately stated, a reaction force between the resilient element and the vessel preloads the clutch. Hence, the loading of the clutch by element 406 is not associated with or dependent upon the eventual connection of the assembly to a drive unit. Thus, assembly 400 is a pre-loaded modular unit that does not require any further manipulation of parts to attain a loaded state for the clutch, greatly simplifying the eventual installation of limiter 400 into a drive train.

Clutch 402 is assembled by stacking the damper assembly and drive plates in housing 424 and then stacking element 406 on the drive plates. Snap ring 427 is then inserted in housing 424 applying axial force to element 406. The element reacts against the snap ring to apply the preload force to clutch 402. Housing 414 is then connected to housing 424, for example, by weld 426.

Damper 412 is arranged for rotation connection to input shaft 428 of a transmission (not shown) by any means known in the art, for example, hub 430 and pump hub 432. Thus, a torque path from the drive unit to the transmission is established through limiter 400. The torque path includes torque limiting through the slipping action of clutch 402 and dampening through the operation of damper 412.

In some aspects, friction material 434 is axially disposed between the drive plates, plates 436 and 438, and/or element 406. Clutch 402 is not limited to any particular type or configuration of friction materials 434. Clutch 402 is not limited to any number of plates 436 or 438. In some aspects, friction materials are fixedly secured to the drive plates, plates 436 and 438, and/or element 406. In some aspects, clutch plates are disposed axially between the drive plates, plates 436 and 438, and/or element 406. In some aspects, there is no friction material used, or a rust-preventive material, such as grease, is applied to the drive plates, plates 436 and 438, and/or element 406.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A torque limiter comprising:
   a sealed vessel with a damper assembly, wherein a portion of the sealed vessel is formed by a housing; and,
   a clutch arranged to receive torque from a drive unit and to transmit said torque to said damper assembly, wherein said clutch is loaded independent of an engagement of said limiter with said drive unit by a resilient element in contact with the housing, and said clutch is arranged to slip at a specified torque value.

2. The limiter of claim 1 wherein said resilient element is arranged to preload said clutch such that said clutch remains fully engaged up to said specified torque value.

3. The limiter of claim 2 further comprising a drive unit connection plate arranged for connection to said drive unit and wherein said clutch is disposed between said drive unit connection plate and said vessel.

4. The limiter of claim 3 wherein said clutch is connected to said housing, and said clutch is arranged to transfer said drive unit torque to said housing.

5. The limiter of claim 4 wherein said resilient element is secured to said housing.

6. The limiter of claim 2 further comprising a drive unit connection plate arranged for connection to said drive unit and wherein the housing is connected to said drive unit connection plate and said clutch is disposed between said housing and said damper assembly.

7. The limiter of claim 6 wherein said sealed housing encloses a fluid.

8. The limiter of claim 6 wherein said resilient element is slidingly engaged with said housing.

9. The limiter of claim 8 wherein said resilient element preloads said clutch in response to said contact with the housing.

10. The limiter of claim 6 further comprising a snap ring engaged with said housing and in contact with said resilient element and said resilient element preloads said clutch in response to said contact.

11. The limiter of claim 1 wherein said clutch is a dry clutch.

12. A torque limiter comprising:
   a drive unit connection plate arranged for connection to a drive unit and to transmit torque from said drive unit;
   a sealed vessel with a damper assembly, wherein a portion of the sealed vessel is formed by a housing; and,
   a clutch in a torque transmission path between said drive unit connection plate and said damper, wherein a reaction force between a resilient element, in contact with the housing, in said clutch and said vessel preloads said clutch and wherein said clutch is arranged to slip at a specified torque value.

13. The limiter of claim 12 wherein said clutch is disposed between said drive unit connection plate and said sealed vessel.

14. The limiter of claim 12 wherein said clutch is disposed between said housing and said damper assembly.

* * * * *